United States Patent
Park et al.

(10) Patent No.: US 6,746,500 B1
(45) Date of Patent: Jun. 8, 2004

(54) CYCLONE DUST COLLECTOR

(75) Inventors: Deog Bae Park, Changwon (KR); Byung Sun Yang, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/204,046

(22) PCT Filed: Mar. 15, 2000

(86) PCT No.: PCT/KR00/00213
§ 371 (c)(1),
(2), (4) Date: Nov. 14, 2002

(87) PCT Pub. No.: WO01/60524
PCT Pub. Date: Aug. 23, 2001

(30) Foreign Application Priority Data

Feb. 17, 2000 (KR) .......................................... 2000-7607

(51) Int. Cl.[7] .............................................. B01D 45/12
(52) U.S. Cl. ............................. 55/343; 55/349; 55/426; 55/429; 55/459.1
(58) Field of Search ................................ 55/426, 459.1, 55/349, 429, 345, 343, 467, 342, 424

(56) References Cited

U.S. PATENT DOCUMENTS

| | | | | |
|---|---|---|---|---|
| 2,071,975 A | * | 2/1937 | Holm-Hansen et al. ........ 55/413 |
| 2,542,634 A | * | 2/1951 | Davis et al. .................... 55/426 |
| 2,942,691 A | * | 6/1960 | Dillon ........................... 55/426 |
| 3,049,343 A | * | 8/1962 | Helming ........................ 34/592 |
| 6,221,134 B1 | * | 4/2001 | Conrad et al. ................. 95/271 |

* cited by examiner

Primary Examiner—Robert A. Hopkins
(74) Attorney, Agent, or Firm—McKenna Long & Aldridge LLP

(57) ABSTRACT

Multi-cyclone dust collector including a primary cyclone body and dust collecting box for causing circulation of air and collecting various foreign matters, the primary cyclone body and dust collecting box having a first air inlet for drawing air together with various foreign matters and a first air outlet for discharging air from which the various foreign matters are removed primarily, a secondary cyclone body over the primary cyclone body and dust collecting box for causing circulation of the air to flow in a direction at a right angle to the direction of air flow in the primary cyclone body and dust collecting box, the secondary cyclone body having a second air inlet in communication with the first air outlet for drawing the air from the primary cyclone body and dust collecting box to the secondary cyclone body in a direction tangential to an inside circumference of the secondary cyclone body, and a second air outlet in a center of one side of the second air cyclone body in the vicinity of the first air outlet having an extension piece to inside of the secondary cyclone body in communication with a space where the fan is located, and a second dust collecting box having an opening to the other side of the second air inlet.

20 Claims, 11 Drawing Sheets

CYCLONE DUST COLLECTOR

TECHNICAL FIELD

The present invention relates to a cyclone dust collector for collecting various foreign matters, such as dust by using a cyclone principle, and more particularly, to a multi-cyclone dust collector, in which a cyclone operation is repeated for improving a dust collecting performance.

BACKGROUND OF THE RELATED ART

In general, the cyclone dust collector separates and collects foreign matters from air by using centrifugal force, and is applied to a domestic vacuum cleaner. Of different types of cyclone dust collectors, a multi-cyclone dust collector, in which a primary cyclone dust collecting device and a secondary cyclone dust collecting device are connected to for one unit of cyclone dust collector for multi-stage foreign matter collection, can provide an excellent dust collecting performance than a single cyclone dust collector with one cyclone device. That is, the primary cyclone dust collecting device collects foreign matters of comparatively great size, and the secondary dust collecting device collects fine foreign matters collection of which are unable by means of the primary cyclone dust collecting device. FIGS. 1 and 2 illustrate one example of the multi-cyclone dust collector, referring to which the multi-cyclone dust collector will be explained.

The multi-cyclone dust collector is provided with a primary cyclone dust collecting part 1, and a secondary cyclone dust collecting part 2 inside of the primary cyclone dust collecting part, a fan 3 for drawing air through respective cyclone parts, a fan motor 4 for driving the fan 3. The primary cyclone dust collector 1 is provided with an outer shell 1a forming a body of the primary cyclone dust collector 1 and serving as a dust collecting vessel, a first air inlet 1b formed in one side of an upper portion of the outer shell for drawing room air, and a first air outlet 1c. And, the secondary cyclone dust collecting part 2 is provided with an inner body 2a spaced from an inside of the outer shell 1a of the primary cyclone dust collecting part, a second air inlet 2b for air inlet into the inner body 2a, and a second air outlet 2c for discharging air from the inner body. The second air inlet 2b is designed to be in communication with the first air outlet 1c in the primary dust collecting part 1 for leading air to flow from the primary cyclone dust collecting part 1 to the secondary dust collecting part 2. The second air outlet 2c is in communication with a space where the fan 3 and fan motor 4 are disposed. The inner body 2a has a cone shape with a diameter become the smaller as it goes downward, and there is a dust collecting part 2d under the inner body 2a for collecting fine dust separated from the air. The dust collecting part 2d is separated from a bottom portion of the primary cyclone dust collecting part 1 by an additional partition 2e. Accordingly, the fan motor 4 drives the fan 3 to draw air from the first air inlet 1b via the second air outlet 2c, the second air inlet 2b, and the first air outlet 1c. The air drawn into the outer shell 1a circulates along an inner side of the outer shell 1a and an outer side of the inner body 2a, together with dust, during which the air drawn into the inner body 2a through the first air outlet 1c, and the dust is collected at the bottom of the outer shell 1a. However, as fine dust, so light to be separated by a centrifugal force of the first cyclone dust collecting part, is drawn into the inner body 2a through the first air outlet 1c together with the air, and separated in the inner body 2a during the air and dust circulate around the inner body 2a The dust separated from the air thus is dropped down by its weight and collected in the dust collecting part 2d, and the air, as it rises along a center portion of the inner body 2a, is discharged to the space where the fan 3 and fan motor 4 are located through the second air outlet 2c. However, the cyclone dust collector has the following problems in view of the structure.

First, a dust collecting capacity of the primary cyclone dust collecting part 1 has been comparatively small. That is, the disposal of the secondary cyclone dust collecting part 2 in the primary cyclone dust collecting part 1 causes a problem in that the dust collecting capacity of the primary cyclone dust collecting part 1 which should collect large sized dust becomes small, that in turn causes an inconvenience of frequent dust removal.

Second, if there is continuous inflow of much dust into the secondary cyclone dust collecting part 2 in comparison to the dust collecting capacity of the secondary cyclone dust collecting part 2, excessive dust over the dust collecting capacity passes through the secondary dust collecting part 2 and enters into the fan motor 4. This is because the cyclone dust collector is designed such tat the primary cyclone dust collecting part 1 collects large sized dust while the fine dust is discharged to the secondary cyclone dust collecting part 2. That is, even though it is desirable that the primary cyclone dust collecting part 1 collects dust as much as possible including the fine dust, the primary cyclone dust collecting part fails it, to cause frequent failure of the fan motor, and to require frequent removal of collected dust Third, in removal of the fine dust collected in the dust collecting part 2d done by removing the inner body 2a from the outer shell 1a and removing the dust through an opening for the inner body 2a, the partition 2e impedes a smooth removal of the fine dust, to cause inconvenience to the user and bad smell of decomposed dust remained in the dust collecting part 2d.

DISCLOSURE OF INVENTION

An object of the present invention is to provide a multi-cyclone dust collector, of which primary cyclone dust collecting part can collect dust as much as possible including fine dust for preventing damage to the fan motor in advance.

Another object of the present invention is to provide a multi-cyclone dust collector which can remove the collected dust smoothly.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the multi-cyclone dust collector includes a primary cyclone body and dust collecting box for causing circulation of air and collecting various foreign matters, the primary cyclone body and dust collecting box having a first air inlet for drawing air together with various foreign matters and a first air outlet for discharging air from which the various foreign matters are removed primarily, a secondary cyclone body over the primary cyclone body and dust collecting box for causing circulation of the air to flow in a direction at a right angle to the direction of air flow in the primary cyclone body and dust collecting box, the secondary cyclone body having a second air inlet in communication with the first air outlet for drawing the air from the primary cyclone body and dust collecting box to the secondary cyclone body in a direction tangential to an inside circumference of the secondary cyclone body, and a second air outlet in a center of one side of the secondary cyclone body in the vicinity of the first air outlet having an extension piece to inside of the secondary cyclone body in communication with a space where the fan is located, and a second dust collecting box having an opening to the other side of the second air inlet.

In other aspect of the present invention, there is provided a dust collecting box in a cyclone dust collector for drawing air together with foreign matters, separating the foreign matters from the air by a cyclone principle, and collecting the separated foreign matters in a dust collecting box, including a partition plate inside of the dust collecting box for dividing the dust collecting box into an upper portion and a lower portion and providing a gap between the partition plate and the inside wall surface of the dust collecting box.

BEST MODE FOR CARRYING OUT THE INVENTION

Figure 1:
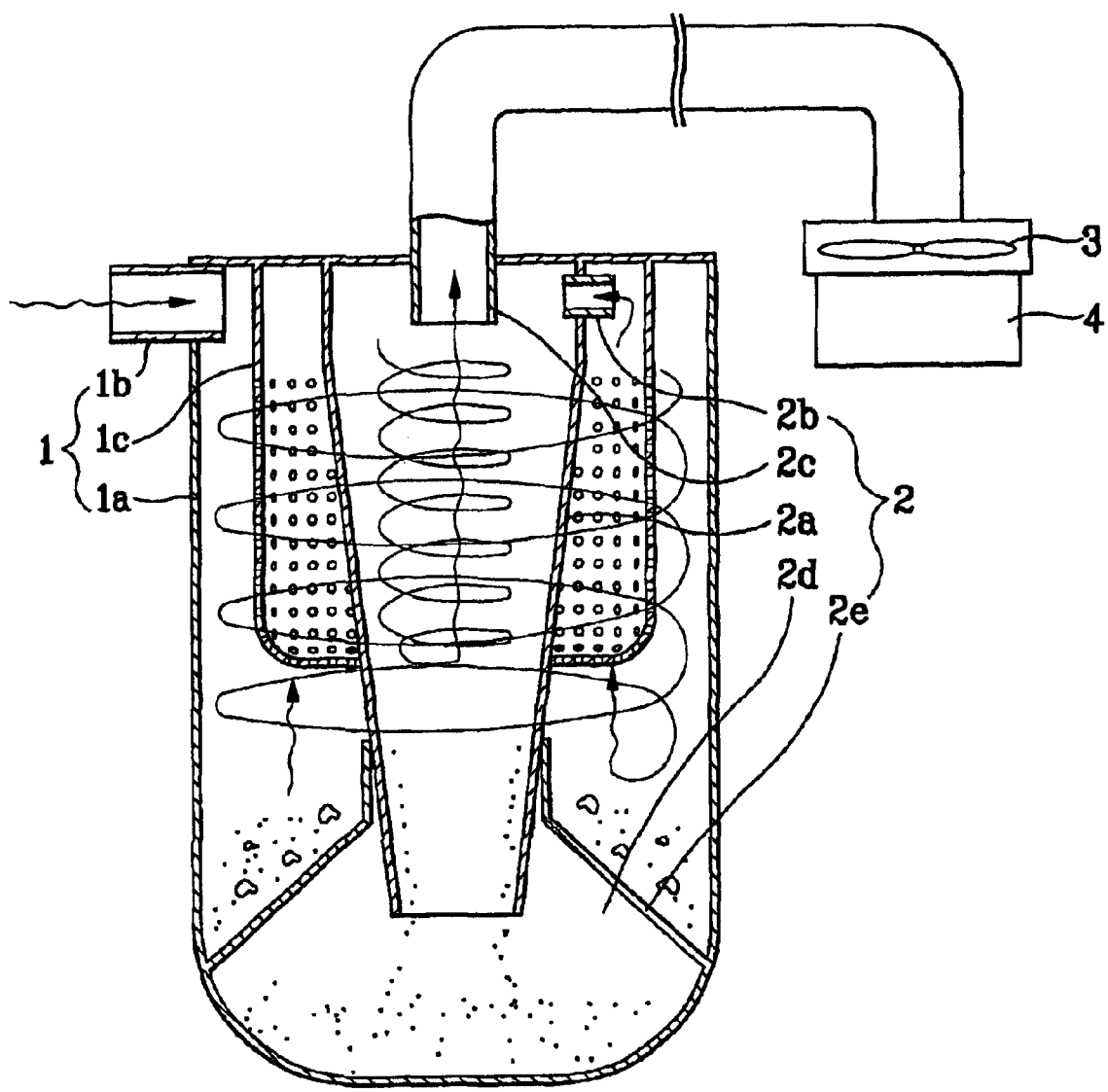
FIG. 1 illustrates a section of a related art multi-cyclone dust collector, schematically.
Figure 2:
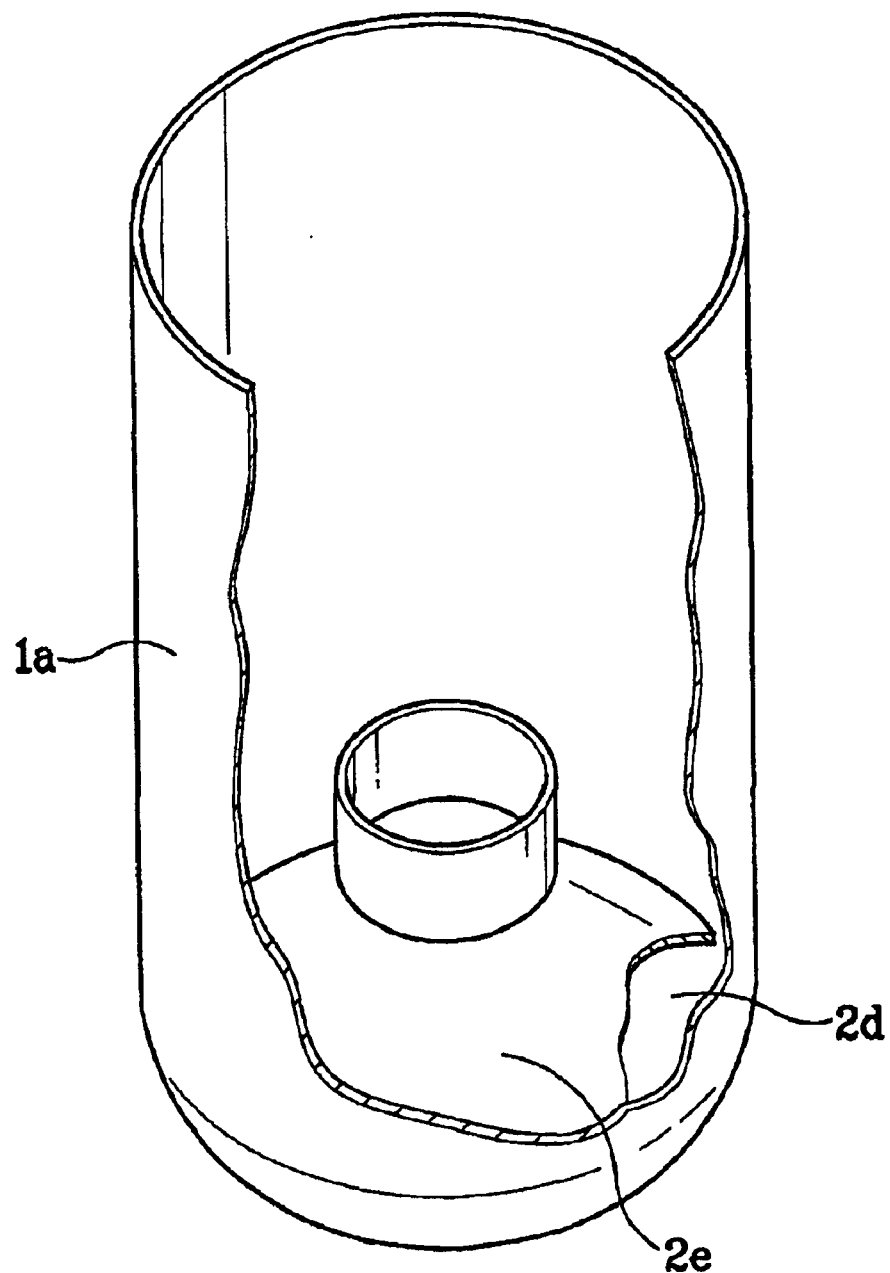
FIG. 2 illustrates a perspective view of an outer shell of the related art multi-cyclone dust collector.
Figure 3:
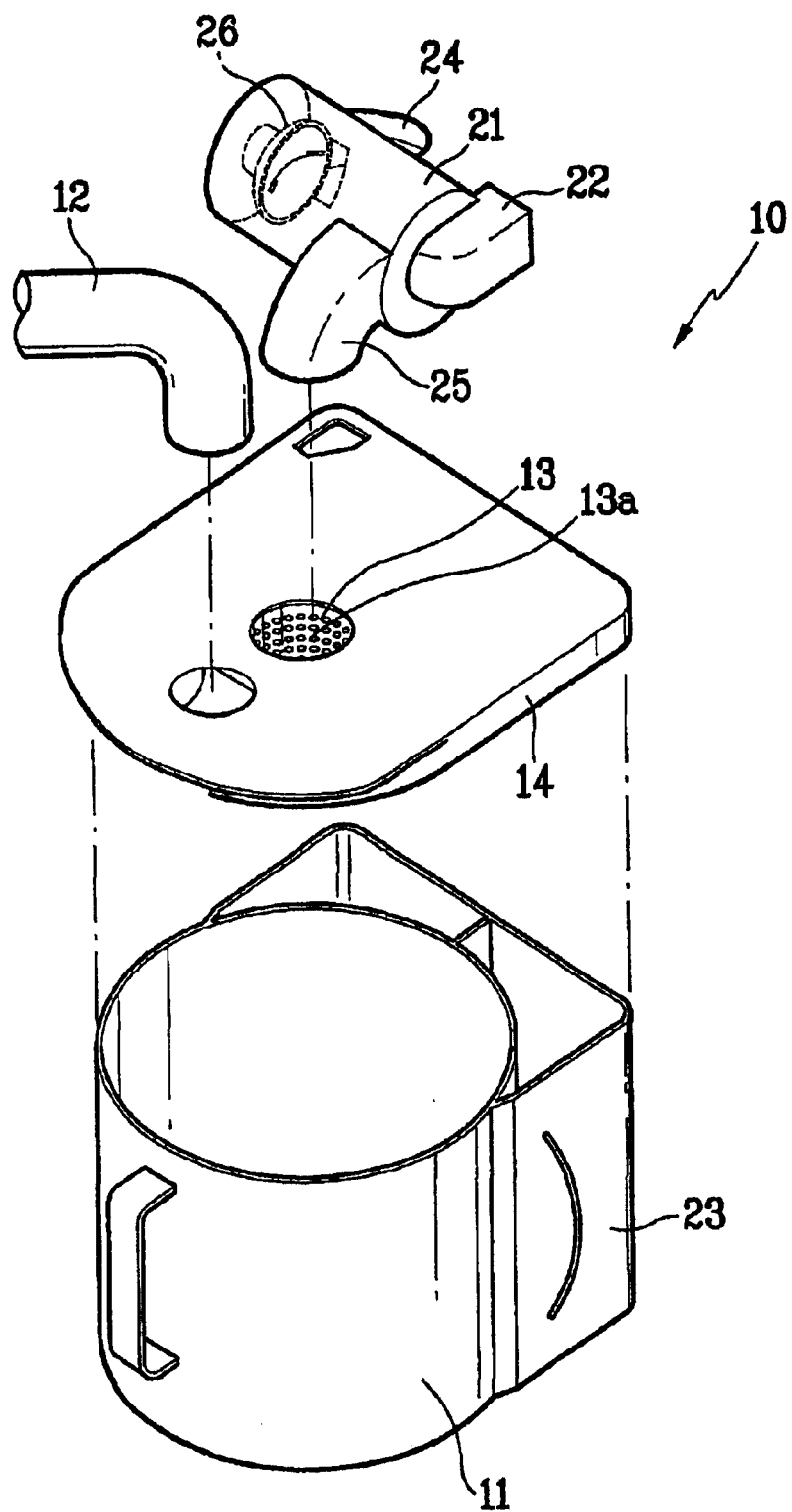
FIG. 3 illustrates a perspective disassembled view showing key parts of a multi-cyclone dust collector in accordance with a first preferred embodiment of the present invention.
Figure 4:
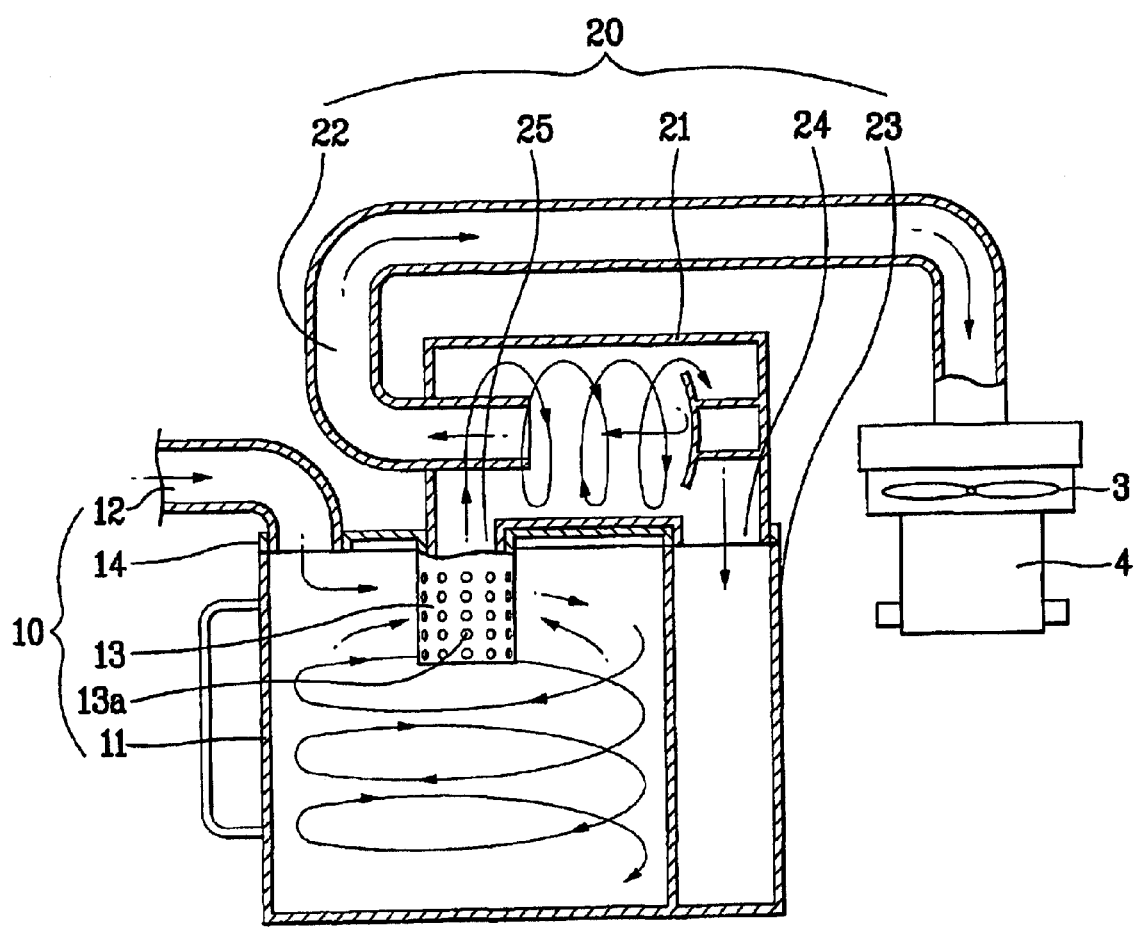
FIG. 4 illustrates a section showing an assembled view of a multi-cyclone dust collector in accordance with a first preferred embodiment of the present invention, schematically.

Reference will now be made in detail to the preferred embodiments of the present invention, examples of which are illustrated in the accompanying drawings. FIG. 3 illustrates a perspective disassembled view showing key parts of a multi-cyclone dust collector in accordance with a first preferred embodiment of the present invention, and FIG. 4 illustrates a section showing an assembled view of a multi-cyclone dust collector in accordance with a first preferred embodiment of the present invention, schematically. The present invention, in a first embodiment, suggests a multi-cyclone dust collector, with a dust collecting box of the primary cyclone dust collecting part maximized.

In the multi-cyclone dust collector in accordance with a first preferred embodiment of the present invention, there is a secondary cyclone dust collecting part 20 provided over a primary cyclone dust collecting part 10, such that a direction of air flow in the secondary cyclone dust collecting part 20 is at a right angle to a direction of air flow of the print cyclone dust collecting part 10, and a second dust collecting box 23 of the secondary cyclone dust collecting part 20 is unitized around a dust collecting box 11 of the primary cyclone dust collecting part 10. The primary cyclone dust collecting part 10 includes a first air inlet 12 in a top side of a dust collecting box 11 of a cylindrical form, and a first air outlet 13 in top center of the dust collecting box 11. The dust collecting box 11 has an opened top part which can be selectively opened /closed with a cover part 14 having a first air outlet 13 integrated thereto. The first air outlet 13 is a perforation of holes 13a formed around a piece of pipe, each of which holes is sized such that various foreign matters over a certain size drawn into the dust collecting box 11 are not passed through. And, of the secondary cyclone dust collecting part 20, there is a second air inlet 25 in a circumference of the secondary cyclone body 21 near to one end thereof in communication with the first air outlet 13 of the primary cyclone dust collector 10, and a dust outlet 24 in a circumference of the secondary cyclone body 21 near to the other end thereof opposite to a position of the second air inlet 25 for leading the dust to a second dust collecting box 23. And, there is a second air outlet 22 connected to, and extended inwardly from a center of one side of the secondary cyclone body 21 near to a portion the second air inlet 25 is connected thereto. The second air outlet 22 is connected to a pipe leading to the fan 3 with a fan motor 4 for drawing air through the pipe. And, there is an expanded pipe part 26 gradually expanded as it goes toward the second air outlet 22 fitted projected from an opposite side of the second air outlet 22 in the secondary cyclone body 21. The expanded pipe part 26 induces formation of circulation of the air and the dust, flowed into the secondary cyclone body 21, making cyclone movement therein, and to be discharged through the second air outlet 22, and prevent the air and dust from reaching to a location where the dust outlet 24 is formed, for preventing the fine dust discharged through the dust outlet 24 from being laden on the discharged air. In one embodiment of the present invention, a dust collecting space of the primary cyclone dust collecting part 10, i.e., an inside dust collecting space of the dust collecting box 11 is maximized, for smooth collection of comparatively large foreign matters. That is, the present invention modifies the related art multi-cyclone dust collector for solving the problem of small dust collecting space coming both from disposing the secondary cyclone dust collecting part 2 inside of the primary cyclone dust collecting part 1 and providing a partition between the collecting parts 1 and 2.

Figure 5:
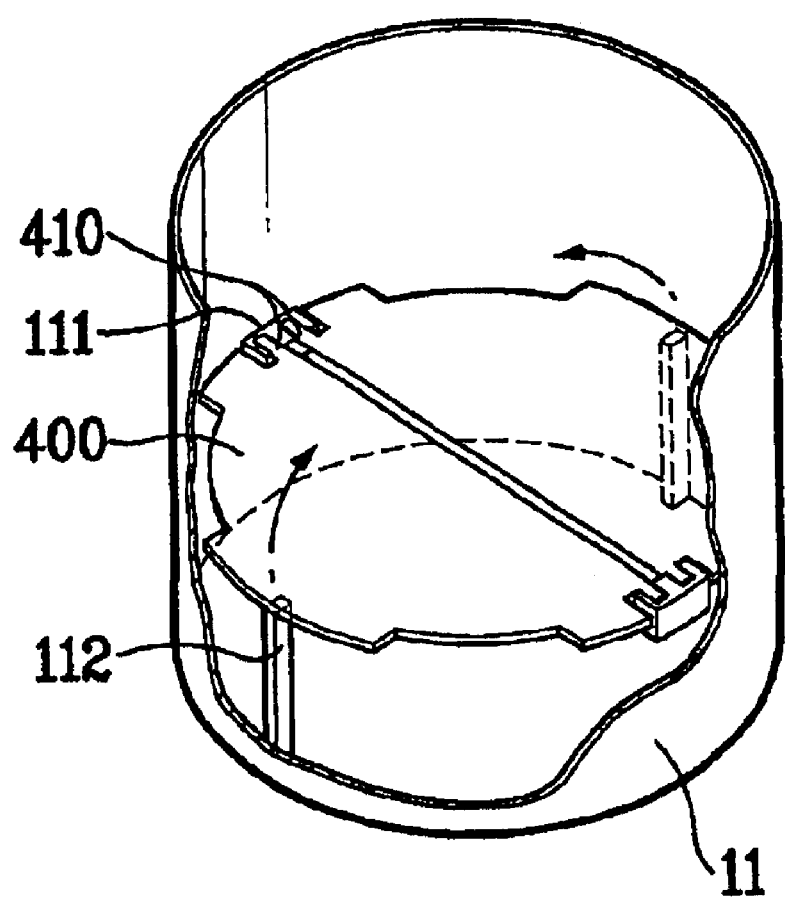
FIG. 5 illustrates a perspective view of a dust collecting box with a partial cut away view in accordance with another preferred embodiment of the present invention.
Figure 6:
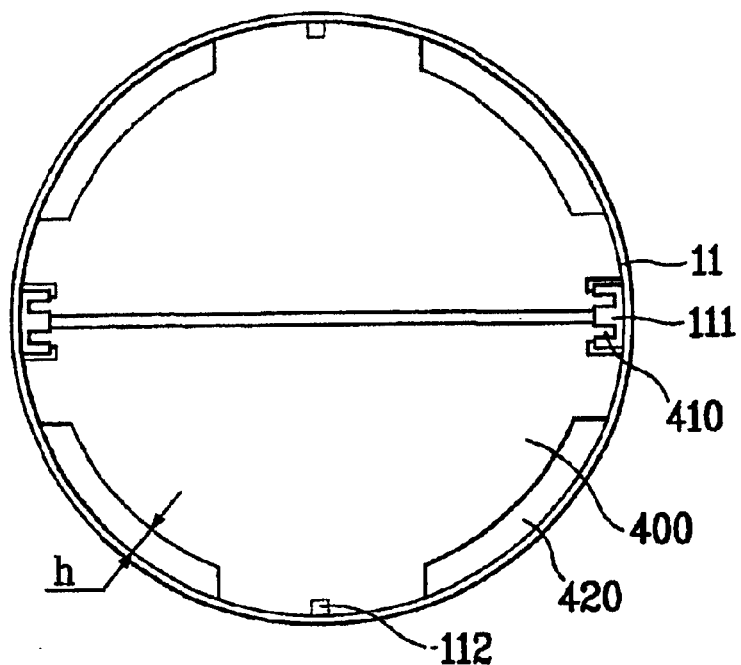
FIG. 6 illustrates a plan view of the dust collecting box in FIG. 5.
Figure 7:
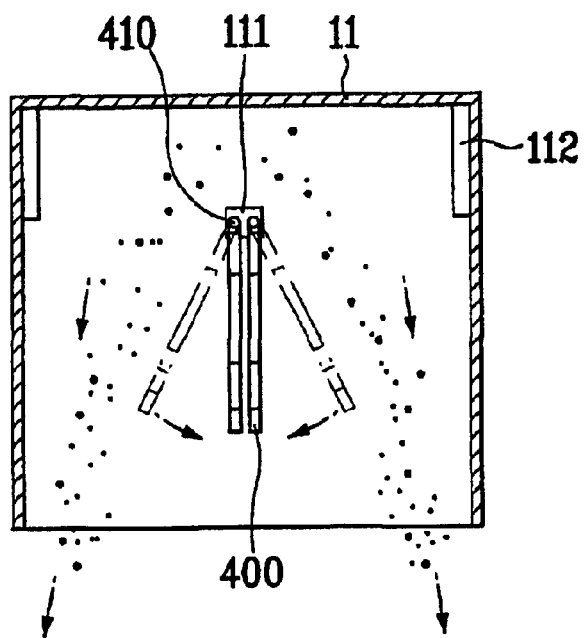
FIG. 7 illustrates a section showing a state dust is discharged from the dust collecting box in FIG. 5.

In the meantime, FIGS. 5~7 illustrate a structure in accordance with another embodiment of the present invention. That is, in the another embodiment of the present invention, a dust collecting box 11 is provided with a partition plate 400 inside of the dust collecting box 11 for dividing the dust collecting box 11 into an upper space and a lower space. The partition plate 400 has cut away portions around a circumference thereof, to provide a gap 'h' between the partition plate 400 and an inside surface of the dust collecting box 11. Particularly, the present invention designs for a more smooth discharge of fine dust collected in a lower space of the dust collecting box 11 as divided by a partition plate 400. To do this, the present invention suggests rotatably fitted partition plate 440 inside of the dust collecting box 11. That is, as shown in FIG. 7, when the dust collecting box 11 is turned upside down for removing the dust collected in the dust collecting box 11, the partition plate 400 is rotated to permit full open of the upper and lower spaces of the dust collecting box 11, for minimizing interference of the dust removal by structural parts. To do this, the partition plate 400 is divided into two pieces along a center line, hinges 410 are provided to each of the divided partition plate 400 at opposite surfaces of the partition plate 400, and hinge supports 111 are provided on an inside surface of the dust collecting box 11 opposite to positions of ends of the hinges 410 for receiving the hinges. And, there are supporting ribs 112 in a lower space of the dust collecting box 11 for preventing downward rotation of the partition plate.

Figure 8:
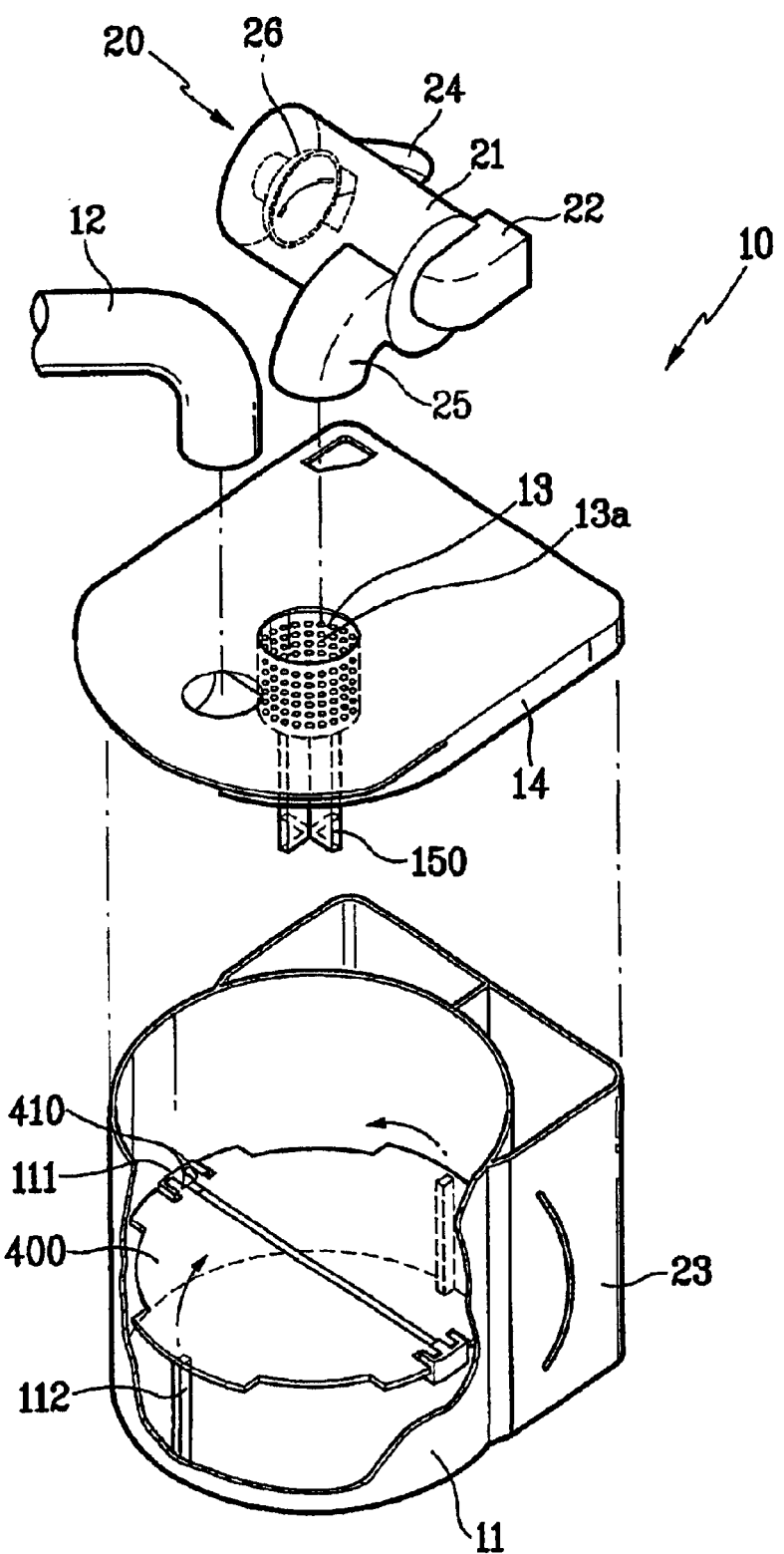
FIG. 8 illustrates a perspective disassembled view of a dust collecting box in another preferred embodiment of the present invention applied to a multi-cyclone dust collecting device in accordance with a first preferred embodiment of the present invention.
Figure 9:
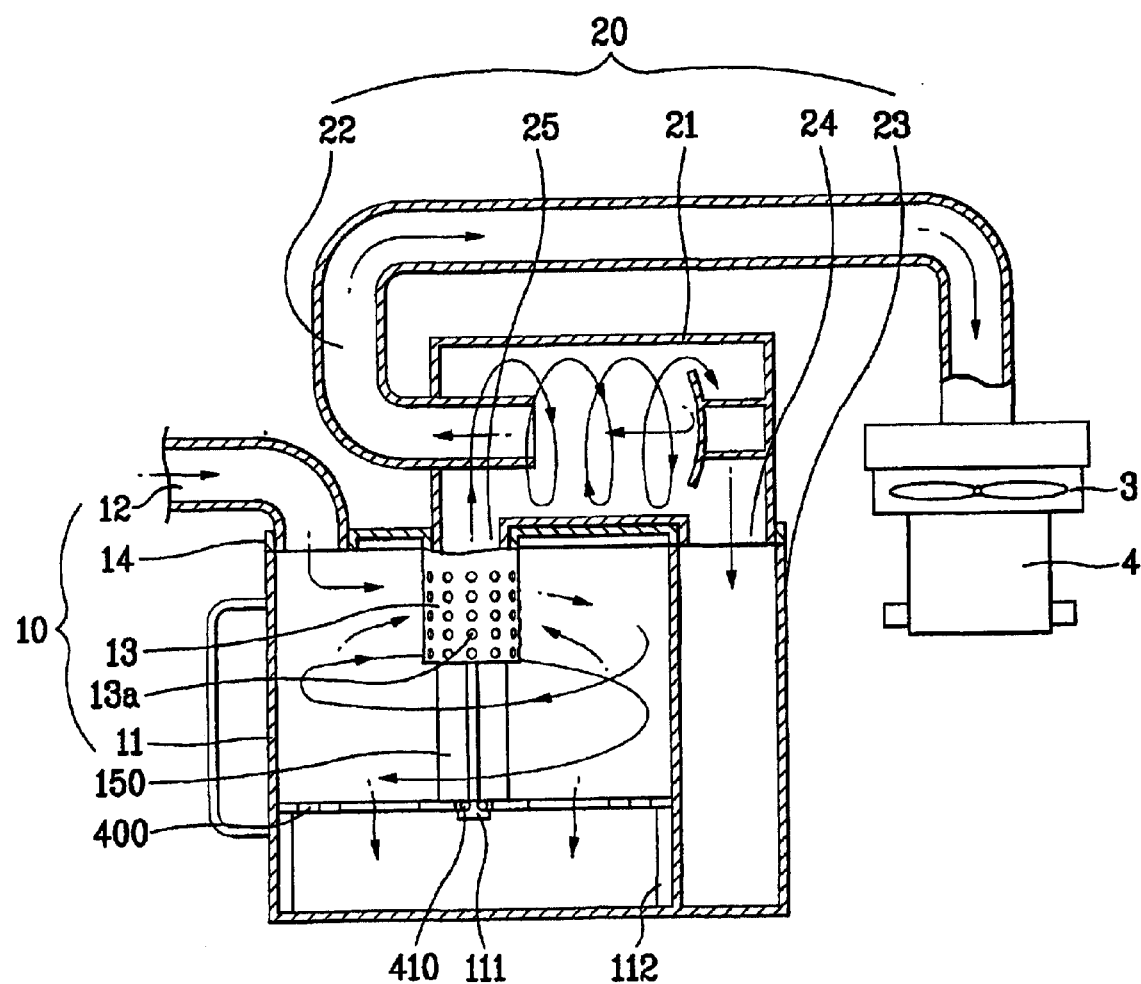
FIG. 9 illustrates a section of the multi-cyclone dust collector having the dust collecting box applied thereto.
Figure 10:
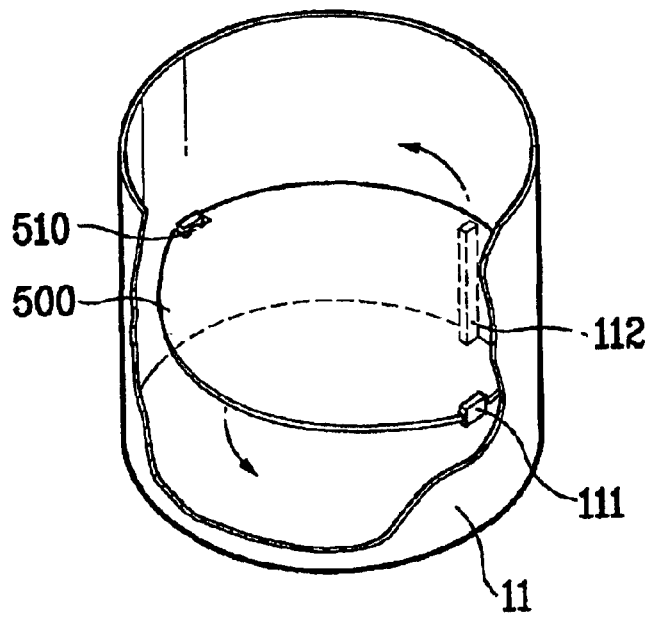
FIG. 10 illustrates a perspective view of a dust collecting box with a partial cut away view in accordance with another preferred embodiment of the present invention.
Figure 11:
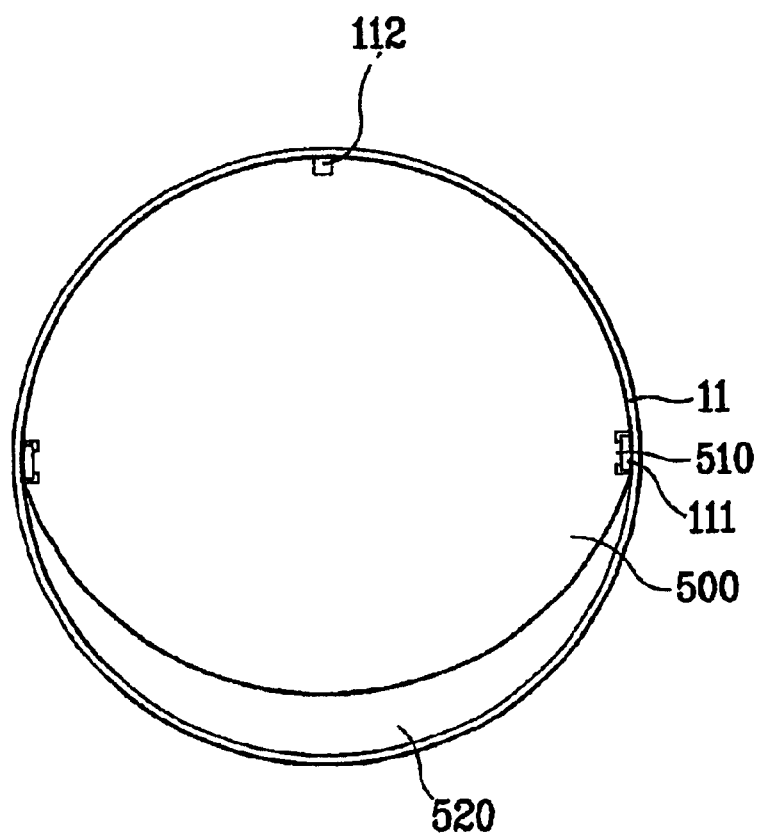
FIG. 11 illustrates a plan view of the dust collecting box in FIG. 10.
Figure 12:
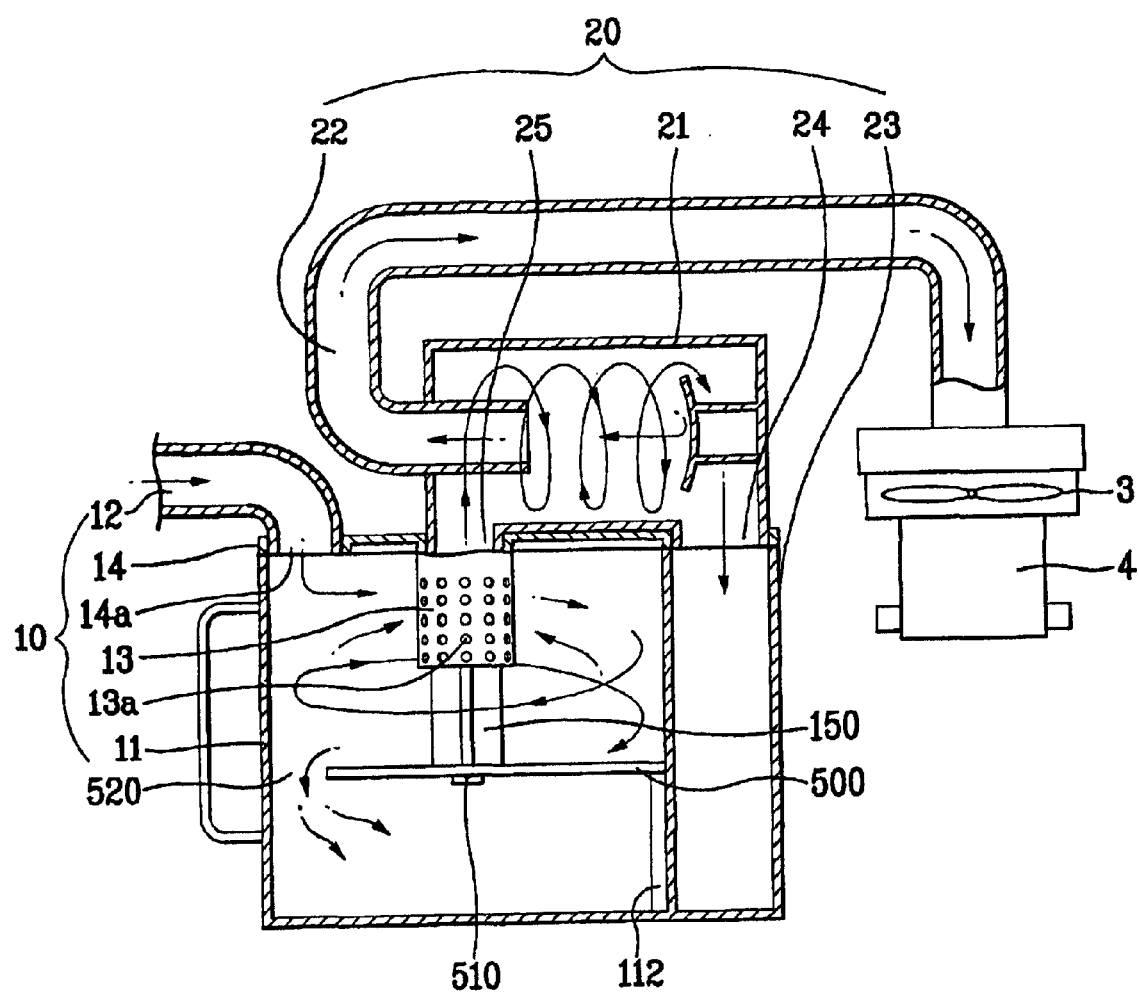
FIG. 12 illustrates a section of a multi-cyclone dust collector having the dust collecting box in FIG. 10 applied thereto, schematically; and, FIG. 13 illustrates a section showing a state of dust discharge from the dust collecting box in FIG. 12.

FIGS. 8 and 9 illustrate a section of the multi-cyclone dust collector having the dust collecting box with a rotatably fitted partition plate applied thereto.

In this instance, there is a projection 150 fitted to an underside of the first air outlet 13 and extended to reach to a top surface of the partition plate 400 for preventing movement of the partition wall. That is, during operation of the cyclone dust collector, since the dust in the lower space of the dust collecting box 11 is liable to fly carried by an upward air flow if the partition plate 400 is lifted, the projection 150 is provided for preventing the lifting of the partition plate 400. And, it is preferable that the projection 150 has a form of cross blade for reducing circulation around the projection 150.

The operation of the aforementioned cyclone dust collector will be explained in detail.

Upon rotation of the fan 3, room air is drawn through the first air inlet 12 in the first cyclone duct collecting part 10, together with various foreign matters including dust. Then, the air and the foreign matters circulate within the dust collecting box 11, to separate the foreign matters from the air, primarily. During the process, the various foreign matters are dropped down into the lower space of the dust collecting box through the gap 420 between the partition plate 400 and the dust collecting box 11 in the primary cyclone dust collecting part 10. The gap 420 is formed by inward recessing portions of circumference of the partition plate 400. The partition plate 400 prevents an air circulation in the upper space of the dust collecting box 11 from reaching down to the lower space, thereby preventing the foreign matters in the lower space re-enter into the air stream. The prevention of re-entrance of the foreign matters into the air stream permits an amount of foreign matters trapped in the dust collecting box 11 to be the maximum, including fine dust, with reduced quantity of fine dust which enters into the secondary cyclone dust collecting part 20. The air and the fine dust entering into the secondary cyclone body 21 of the secondary dust collecting part 20 through the first air outlet 13 and the second air inlet 25 is circulated in a course of entering into the secondary cyclone body 21 because the secondary air inlet 25 is formed tangential to a circumference of the secondary cyclone body 21. According to this, the fine dust is separated from the air during the circulation in the secondary cyclone body 21. Then, the fine dust is discharged into the secondary dust collecting box 23 through the dust outlet 24, and the air after the fine dust is separated therefrom collides onto the expanded pipe part 26 and discharged toward the fan 3 and the fan motor 4 through the second air outlet 22. If the dust collecting box 11 is full with the various foreign matters after prolonged use of the dust collector, the dust collecting box 11 should be emptied. In this instance, the dust collecting box 11 is separated from the primary cyclone dust collecting part, and the cover part 14 which closes top of the dust collecting box 11 is removed. The removal of the cover part 14 result in removal of the projection 150 from the top of the partition plate 400, to free the partition plate 400. Under this state, if the dust collecting box 11 is turned upside down for removal of the dust in the dust collecting box 11, each pieces of the partition plate 400 is rotated on the hinges 410 as an axis supported on the hinge support 111 on the dust collecting box 11, to open the lower space of the dust collecting box 11 fully, thereby permitting smooth removal of the collected various foreign matters.

FIGS. 10~13 illustrate another embodiment of a cyclone dust collector of the present invention. In this another embodiment, the partition plate 500 is, different from the first embodiment, not divided into two pieces, but left as one piece and made rotatable within the dust collecting box 11. That is, hinges 510 are formed on opposite circumference of the partition plate as a unit with the partition plate, and hinge supports 111 are formed on an inside surface of the dust collecting box 11 for receiving the hinges 510. The partition plate is substantially circular, but sizes of a left portion and a right portion of the partition plate with reference to a line connecting the hinges 510 are formed different, with a gap 520 formed between a circumference of a smaller portion and the inside wall surface of the dust collecting box 11 for entrance of the fine dust into the lower space. There is a supporting rib 112 in a lower space of the dust collecting box 11 under the greater portion, for preventing downward movement of the greater portion. Alike the first embodiment, there is a projection 150 on underside of the first air outlet 13 integrated to the cover part 14 of the dust collecting box 11, for preventing movement of the partition plate 500 when the dust collecting box 11 is closed with the cover part 14.

The operation for removing the various foreign matters collected in the dust collecting box will be explained in detail, while the operation for collecting the various foreign matters is omitted since the operation is the same with the aforementioned first embodiment.

Figure 13:
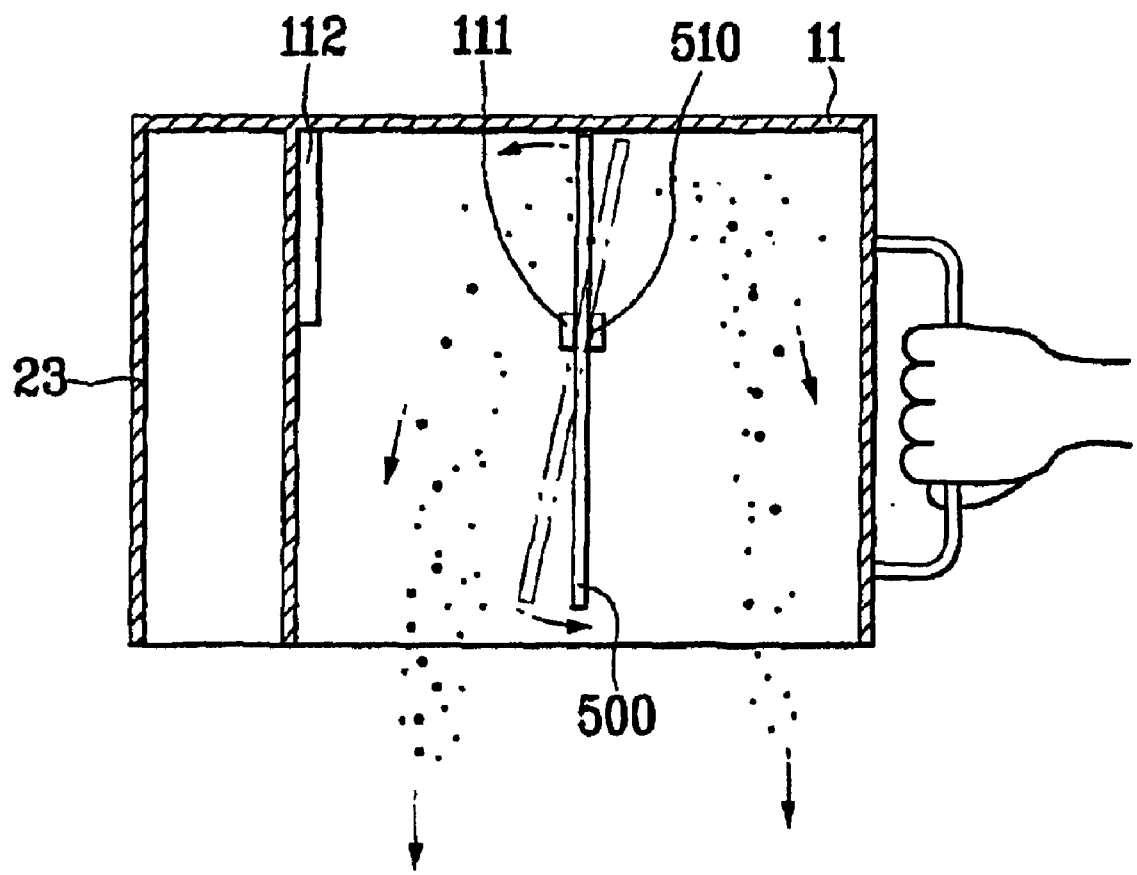

First the primary dust collecting box 11 is separated from the cyclone dust collector, and the cover part 14 which closes top of the dust collecting box 11 is removed. The removal of the cover part 14 result in removal of the projection 150 from the top of the partition plate 500, to free the partition plate 500. Under this state, if the dust collecting box 11 is turned upside down for removal of the dust in the dust collecting box 11, the partition plate 400 is rotated on the hinges 510 as an axis supported on the hinge support 111 on the dust collecting box 11. In this instance, as the sizes of left and right portions are different with reference to the line, with a center of gravity at a point on the greater portion, the greater portion moves down and the smaller portion moves up as shown in FIG. 13, opening the lower space of the dust collecting box 11 filly to permit smooth removal of the various foreign matters collected in the dust collecting box 11.

In the meantime, the multi-cyclone dust collector of the present invention does not limit provision of the rotatable partition plate only to the primary dust collecting box. That is, the rotatable partition plate may also be provided to the secondary dust collecting box of the secondary cyclone dust collecting part.

INDUSTRIAL APPLICABILITY

As has been explained, the multi-cyclone dust collector of the present invention can maximize a dust collecting capacity of the primary cyclone dust collecting part by modifying a structure of dust collecting boxes of the cyclone dust collector. That is, the disposal of the secondary dust collecting part, not in the primary dust collecting part, but separate from, and over the primary dust collecting part permits to maximize the dust collecting capacity of the primary cyclone dust collecting part, which permits maximum collection of fine dust in the primary dust collecting part, that reduces an amount of fine dust entering into the secondary dust collecting part. Accordingly, even the secondary dust collecting part, which has a comparatively small dust collecting capacity, can make an adequate dust collection, that reduces an amount of the fine dust discharged toward the space where the fan motor is disposed.

And, the multi-cyclone dust collector of the present invention permits smooth removal of the various foreign matters from the lower space without interference by providing the partition plate, which divides the dust collecting box into an upper space and a lower space during cleaning and fully opens the two spaces during removal of the collected various foreign matters, for smooth removal of the foreign matters, that prevents the foreign matters from being remained in the dust collecting box, thereby preventing bad smell generated in the dust collecting box as the remained foreign matter decomposes.

It will be apparent to those skilled in the art that various modifications and variations can be made in the multi-cyclone dust collector of the present invention without departing from the spirit or scope of the invention Thus, it is intended that the present invention cover the modifications and variations of this invention provided they come within the scope of the appended claims and their equivalents.

What is claimed is:

1. A multi-cyclone dust collector comprising:
   a primary cyclone body and dust collecting box for causing circulation of air and collecting various foreign matters, the primary cyclone body and dust collecting box having a first air inlet for drawing air together with various foreign matters and a first air outlet for discharging air from which the various foreign matters are removed, primarily;
   a secondary cyclone body over the primary cyclone body and dust collecting box for causing circulation of the air to flow in a direction at a right angle to the direction of air flow in the primary cyclone body and dust collecting box, the secondary cyclone body having a second air inlet in communication with the first air outlet for drawing the air from the primary cyclone body and dust collecting box to the secondary cyclone body in a direction tangential to an inside circumference of the secondary cyclone body, and a second air outlet in a center of one side of the secondary cyclone body in the vicinity of the first air outlet having an extension member to inside of the secondary cyclone body in communication with a space where the fan is located; and,
   a second dust collecting box having an opening to the other side of the second air inlet.

2. A multi-cyclone dust collector as claimed in claim 1, further comprising an expansion pipe part gradually expanded as it goes toward the second air outlet projected from an opposite side of inside of the second air outlet.

3. A multi-cyclone dust collector as claimed in claim 1, wherein the second dust collecting box is integrated to a circumference of the primary cyclone body and dust collecting box.

4. A multi-cyclone dust collector as claimed in claim 1, further comprising a partition plate inside of the primary cyclone body and dust collecting box for dividing the primary cyclone body and dust collecting box into an upper portion and a lower portion, with a gap between the partition plate and an inside surface of the primary cyclone body and dust collecting box.

5. A multi-cyclone dust collector as claimed in claim 4, further comprising hinges fitted to both sides of the partition plate, and hinge supports on an inside surface of the primary cyclone body and dust collecting box for receiving the hinges, for permitting the partition plate to rotate inside of the primary cyclone body and dust collecting box.

6. A multi-cyclone dust collector as claimed in claim 5, wherein the partition plate has two pieces divided along a center line, wherein the hinges are fitted to opposite surface of the pieces, the hinge support fitted on the inside wall surface of the primary cyclone body and dust collecting box for receiving the hinges, and supporting ribs fitted to an inside surface wall of the lower space of the primary cyclone body and dust collecting box for preventing downward rotation of the partition plate.

7. A multi-cyclone dust collector as claimed in claim 5, further comprising a projection having one end extended from one side of a part closing a top of the primary cyclone body and dust collecting box and the other end brought into contact with a top surface of the divided partition plate for preventing movement of the partition plate.

8. A dust collecting box in a cyclone dust collector for drawing air together with foreign matters, separating the foreign matters from the air by a cyclone principle, and collecting the separated foreign matters in a dust collecting box, comprising a rotatable partition plate disposed inside the dust collecting box, the partition plate dividing the dust collecting box into an upper portion and a lower portion, wherein the partition plate provides a gap between the partition plate and an inside wall surface of the dust collecting box, and wherein the partition plate rotatably couples with the dust collecting box to fully open the lower portion to the upper portion.

9. A The dust collecting box as claimed in claim 8, wherein the gap is formed by cutting away a portion of a circumference of the partition plate.

10. A The dust collecting box as claimed in claim 8, further comprising supporting ribs in the lower space of the primary cyclone body and dust collecting box for preventing downward movement of the partition plate.

11. A The dust collecting box as claimed in claim 8, which further comprises hinges which are provided at opposite surfaces of the partition plate and hinge supports which are fitted to an inside surface of the dust collecting box in correspondence to the hinges.

12. A The dust collecting box as claimed in claim 11, wherein the partition plate includes two pieces divided along a center line and hinges fitted to opposite sides thereof.

13. A The dust collecting box as claimed in claim 8, further comprising a projection having one end extended from a cover part for closing a top of the dust collecting box, and the other end brought into contact with a top surface of the partition plate.

14. A cyclone dust collector comprising:
   a first cyclone dust collecting part;
   a first dust collecting box associated with the first cyclone dust collecting part, the first cyclone dust collecting part and the first dust collecting box having a first air inlet and a first air outlet where the first air outlet discharges air from which foreign matters are removed in the first cyclone dust collecting part and the first dust collecting box; and a second cyclone dust collecting part, the second cyclone dust collecting part being disposed over the first cyclone dust collecting part and the first dust collecting box, the second cyclone dust collecting part having a second air inlet in communication with the first air outlet wherein a circulation of the discharged air from the first air outlet through the second cyclone dust collecting part is at a right angle to a direction of air flow in the first cyclone dust collecting part and the first dust collecting box.

15. The cyclone dust collector as claimed in claim 14, the cyclone dust collector further comprising:

a second dust collecting box, the second dust collecting box being in fluid communication with the second cyclone dust collecting part with a dust outlet.

16. The cyclone dust collector as claimed in claim 14, wherein a partition plate is disposed at an inside of both the first cyclone dust collecting part and the first dust collecting box, the partition plate dividing the first cyclone dust collecting part and the first dust collecting box into an upper portion and a lower portion, the partition plate providing a gap which separates the partition plate from an inside surface of both the first cyclone dust collecting part and the first dust collecting box.

17. The cyclone dust collector as claimed in claim 16, wherein the first dust collecting box has a hinge support disposed on the inside surface of both the first cyclone dust collecting part and the first dust collecting box.

18. The cyclone dust collector as claimed in claim 17, the partition plate further comprising:

a hinge disposed on the partition plate wherein the hinge communicates with the hinge support thereby allowing rotation of the partition plate within the first cyclone dust collecting part and the first dust collecting box.

19. The cyclone dust collector as claimed in claim 17, wherein the partition plate further includes a first piece and a second piece, the first piece and the second piece being divided along a center line of the partition plate wherein a hinge is disposed on both the partition plate first piece and the partition plate second piece opposite the partition plate first piece hinge.

20. The cyclone dust collector as claimed in claim 19, the cyclone dust collector further comprising:

a second hinge support disposed on the inside surface of both the first cyclone dust collecting part and the first dust collecting box such that the partition plate first piece hinge and the partition plate second piece hinge communicate with the hinge supports disposed on the inside surface of both the first cyclone dust collecting part and the first dust collecting box.

* * * * *